United States Patent [19]

Mattiolo

[11] Patent Number: 5,054,953
[45] Date of Patent: Oct. 8, 1991

[54] SELF-ADJUSTING DEVICE FOR MUTUAL LOCKING OF TWO BODIES, HAVING A VARIABLE DISTANCE BETWEEN FASTENING POINTS

[75] Inventor: Silvio Mattiolo, Trescore, Italy
[73] Assignee: Videoplastic S.p.A., Gorlago, Italy
[21] Appl. No.: 469,103
[22] Filed: Jan. 24, 1990
[51] Int. Cl.$^5$ .............................................. F16B 39/28
[52] U.S. Cl. .................................. 403/406.1; 403/326; 411/182; 248/603; 248/616
[58] Field of Search ............... 403/405.1, 408.1, 406.1, 403/407.1, 326, 329, 11, 13; 411/182, 183, 55, 60, 338, 339; 248/603, 600, 616, 635

[56] References Cited

U.S. PATENT DOCUMENTS

| | | | |
|---|---|---|---|
| 4,545,697 | 10/1985 | Verdenne et al. | 403/405.1 |
| 4,768,907 | 9/1988 | Gauron | 411/182 X |
| 4,776,737 | 10/1988 | Wollar | 411/55 X |
| 4,828,442 | 5/1989 | Duran | 403/406.1 X |
| 4,898,493 | 2/1990 | Blankenburg | 403/407.1 |
| 4,923,347 | 5/1990 | Morly et al. | 411/182 |

Primary Examiner—Peter M. Cuomo
Attorney, Agent, or Firm—Browdy and Neimark

[57] ABSTRACT

A locking device is described which is self-adjusting in length and it is therefore adapted to compensate possible differences in the distance between the points of mutual fastening of two bodies.

The device of this invention includes a first and a second member, one of them being integral with one of the bodies to be connected, while the second is non-rotatably slidable within the first member, and is biased to partially project out of the latter, by a spring interposed between the first and the second members. The spring keeping the second member abutting against a fastening portion of the second body. The device includes a fastener for mutual fastening of the first to the second member, and to the fastening portion of the second body.

7 Claims, 2 Drawing Sheets

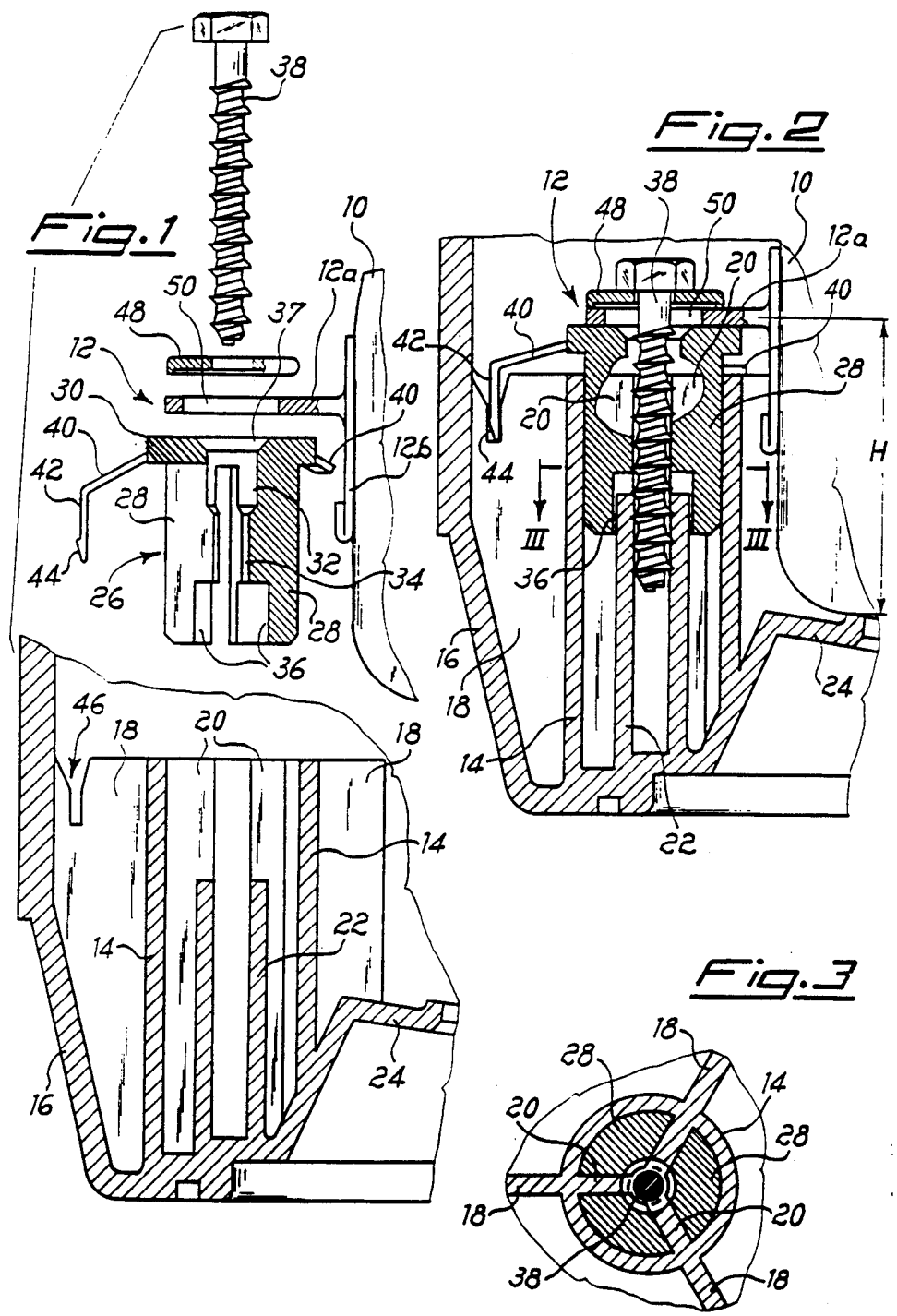

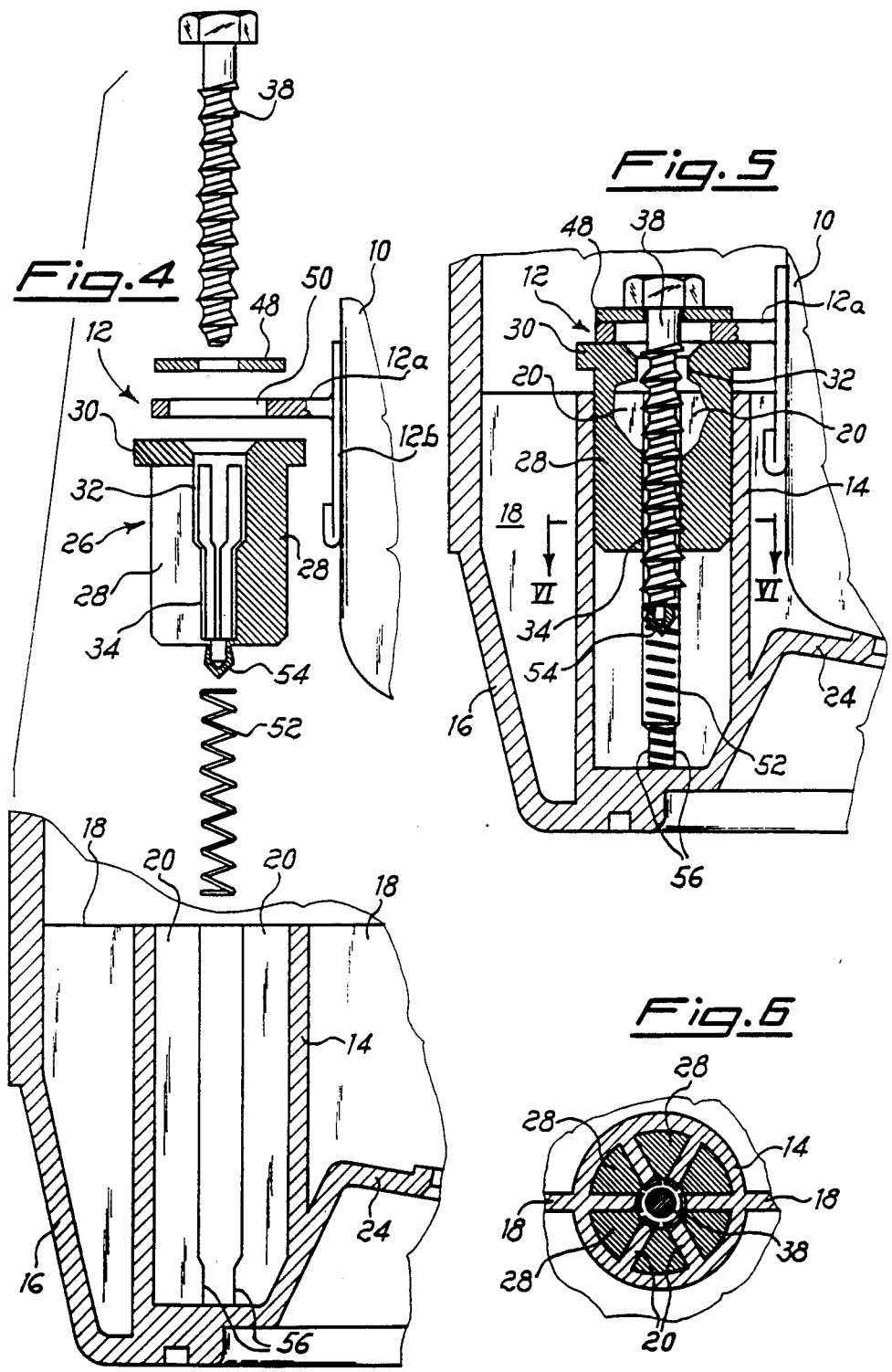

SELF-ADJUSTING DEVICE FOR MUTUAL LOCKING OF TWO BODIES, HAVING A VARIABLE DISTANCE BETWEEN FASTENING POINTS

BACKGROUND OF THE INVENTION

The object of the present invention is a self-adjusting device to perform mutual locking of two bodies, wherein the distance between fastening points of one of the bodies to the other may be variable.

Several types of devices for mutual fastening of a first body to a second body are available, and they are different from each other depending upon the shape of the above bodies, and more particularly upon the shape of the fastening points thereof.

As it is also known, very often the locking devices are unfit to perform the function or to correctly fulfill the task they are entrusted with. This is mainly because the distance between the body portions to be fastened to each other is not always constant, whereby a certain type of locking device, while being suitable for a certain fastening area, may not satisfy the same condition for a different fastening area, still belonging to the two bodies mentioned above.

Therefore, in order to overcome the drawback emphasized above, it is necessary to resort to corrective measures on a case by case basis, which do not as such contribute to a secure and precise locking connection.

It should also be noted that the above corrective measures may be resorted to when the length of the locking device is shorter than the distance between the fastening areas of the two bodies, but the implementation thereof is almost impossible when said distance is shorter than the length of the locking device.

SUMMARY OF THE INVENTION

There has now been devised, and it is the object of this invention, a device for mutually locking two bodies which is suitable to overcome the drawbacks of conventional devices, and to enable the two bodies to be locked together in several fastening areas, even though from an area to the other there is a variable distance between the fastening portions.

To fulfill the object stated above, the device according to this invention is self-adjusting, i.e. it is shaped in such a way as to compensate said difference without any further measures.

Moreover, the object stated above is reached by means of the device according to the invention in that it is adjustable in length and therefore suitable to securely connect to each other fastening areas spaced apart by different distances where the difference can be substantial.

The features as well as the advantages of the locking device of the present invention will appear more clearly from the following detailed description of two exemplificative embodiments of said device, the description being made in the following referring to the attached drawings, wherein:

BRIEF DESCRIPTION OF THE DRAWINGS

FIG. 1 is an exploded longitudinal section view of the first embodiments of the device according to the present invention;

FIG. 2 is a longitudinal section view of the device according to the invention in the locking condition;

FIG. 3 is a sectional view of the device along section line III—III of FIG. 2;

FIG. 4 is an exploded view, similar to FIG. 1, of the second embodiment of the device according to the invention;

FIG. 5 is a view of the alternative embodiment of FIG. 4 in the locking condition; and FIG. 6 is a view of the device along section line VI—VI of FIG. 5.

DETAILED DESCRIPTION OF THE PREFERRED EMBODIMENTS

Both embodiments which will be described in the following relate, for exemplary purposes only, to a particular application of the device according to this invention, but it should be understood that the same innovative concept will be applicable to other types of fastening connections, also in areas of the technology different from the one considered herein.

Throughout this disclosure, for exemplary purposes only, there is considered the case of locking a television tube to the frame of a television set.

The above television tube is indicated by reference number 10 in FIGS. 1 and 2, while number 12 refers to a substantially T-shaped bracket having a side 12a which projects at right angles out of a side edge of the television tube 10, while the second side 12b is securely fastened to said television tube 10.

Even though this will not be described in detail, it is known that television tubes are currently provided, on both the vertical sides thereof, with two metal brackets as the one shown herein, for the fastening thereof to the frame of the television set. In general these brackets are located, on each vertical side, at the upper and lower edge of the television tube, being further positioned close to the front side thereof. These brackets enable the television tube to be fastened to locking means provided on the frame of the television set and cooperating therewith.

It is also known that the television tube brackets are seldom located in the same position but, on the contrary their positioning is affected by a fairly high tolerance which is generally included in the range of plus or minus 2 mm. The difference in position is due, in addition to the above inherent positioning tolerance, to the variable position of the brackets, from one model to the other, as it is often the case for television sets of a company compared to sets of another company.

In summary, when a television tube is inserted in the television frame and brought to about against fixed positioning members thereof, it is in general impossible to use the known locking means since their length precludes the possibility of correctly locking the single brackets to the television frame. Therefore, it is necessary to provide in advance for additional means, such a variable compensation spacers, or similar devices, allowing for the aforesaid engagement between the locking means and the brackets.

Therefore, the known locking devices, and the locking operation in itself, become extremely complicated and consequently very expensive, this factor clearly having a bearing on the final cost of the television set.

Furthermore, with the known locking means mentioned above, the fastening of the television tube is difficult and uncomfortable to perform, both because of the inherent complexity of the locking means, and in that it is known that, at this stage of assembly of the television set, the room the operator has available to perform the locking operation is extremely limited, in that it actually comprises only the gap between the frame inner surface and the television tube. Therefore, in these conditions it becomes difficult to be able to reach, with normal working tools the area where the locking means mentioned above are located.

Obviously the aforesaid drawbacks come up again every time maintenance or repair work has to be performed on the television set, i.e. when the television tube has to be temporarily withdrawn from the television set frame.

A further drawback of the conventional locking devices is due to the difficulty to find spare parts in case one or more of the locking pieces have to be replaced because of wear or failure.

The problems mentioned above are common to a larger share of the conventional locking devices, commonly used to fasten a body to another body.

Still referring to FIGS. 1 and 2, but considering now also FIG. 3, the device includes a first and a second member, cooperating with each other, the first one comprising a substantially tubular body 14, having a cylindrical shape in the embodiment shown herein, as it is in particular apparent from FIG. 3.

The substantially tubular body 14 is integrally fastened to television set frame 16 and, in this particular case, only for manufacturing cost reduction, said tubular member 14 is obtained by integral molding with the television set frame mentioned above.

The substantially tubular body 14 is provided with outer ribs 18, which are in the number of three in the embodiment considered herein and are provided for stiffening purposes only for tubular member 14 whose function is to support a fraction of the complete weight of the television tube 10.

The substantially tubular body 14 is provided as well with three inner ribs 20, regularly spaced from each other circumferentially, as it is apparent from FIG. 3, in the same way as ribs 18 and in particular 120° apart from each other.

As it is shown in greater detail on FIG. 1, inner ribs 20 extend for the whole height of substantially tubular body 14, and substantially over one half of the length thereof they extend, in their lower part, for a shorter length in that, in said lower part there is provided a second substantially tubular body 22 still having, in the embodiment shown herein, a cylindrical shape as the first substantially tubular body 14. The inner surface of second tubular body 22 is flush, without any interruption, with the end edge of inner ribs 20, in such a way as to define a substantially circular cross section passage having a solid wall in the area of the substantially tubular body 22 while, in the area where only ribs 20 are provided, the latter define three circumferential sectors each having a subtended angle of 120° and inside each of said sectors a portion of the second member of the device of this invention will be introduced, as it is described in the following.

Before describing said second member of the device according to this invention, and in particular referring to FIG. 2, it should be noted that television tube 10 is fastened to frame 16 of the television set just by means of the device according to the invention, while at the same time the lower edge thereof bears upon an extension 24 of frame 16.

Since the distance H (FIG. 2), separating bracket 12 from the upper end of extension 24 projecting from frame 16 may vary also in non disregardable measure, it is apparent that the locking of television tube 10 to frame 16 becomes exceedingly difficult and, in some instances, it requires additional pieces to compensate said differences affecting distance H. On the contrary, the device according to this invention enables the television set 10 to be locked to frame 16 for any value of distance H in that, as it will appear from the following, said device allows an automatic compensation of the differences of the distance mentioned above.

The second member of the device according to the invention, which is in general indicated with 26, comprises a substantially cylindrical body divided, over most of the height thereof, in three sectors 28 clearly shown in FIG. 3, as they are introduced in the cavities defined by ribs 20, whereby said sectors extend circumferentially for about 120° and are separated from each other at radial gaps wherein inner ribs 20 of substantially tubular body 14 can be received.

It should be noticed, in particular from FIG. 1, that sectors 28 have a variable thickness since said sectors include, at the top end thereof where they are connected to each other by an annular portion 30 projecting outside cylindrical body 26, a reduced thickness portion shown at 32 whose function will appear more clearly and will be explained in the following.

In a central area the thickness of sector 28 increases along a portion, shown at 34, extending for a height which is approximately one third of the total height of cylindrical body 26.

Eventually sectors 28 have a reduced thickness at the lower end thereof, at a portion 36, said portion thickness being thinner than the thickness of portions 32 of upper end of said sectors 28. As it will be explained in the following, also the thickness reduction of portions 36 has a well defined function.

On annular body 30, which connects sectors 28 to each other, there is centrally provided a flared opening 37 adapted to ease the insertion of a self-tapping locking screw 38 which, while being screwed through the device of the invention will provide for a simultaneous mutual locking of first and second member of the device according to this invention, and therefore will lock television tube 10 to frame 16 of the television set.

Resilient tabs 40 are provided on the portion of annular member 30 projecting from cylindrical body 26, said tabs being in the number of three i.e. as many as outer ribs 18 of substantially tubular body 14, since said resilient tabs 40 are meant to engage with said outer ribs 18. In this connection, mutual engagement of resilient tabs 40 with outer ribs 18 is assured by the forced positioning of the second member 26 relative to first member 14 brought about by insertion of sectors 28 within the matching cavities defined by inner ribs 20.

It should be noticed, in particular from FIGS. 1 and 2 wherein only two of the three resilient tabs 40 are shown, that one of the tabs, the one on the left of said Figures, has an extension 42 substantially at right angles to tab 40, and a little tooth 44 is provided at the end thereof, said tooth being adapted to penetrate with a slightly tight fit within a cavity 46 provided in rib 18 wherein tab 40 is engaged. The function of said extension 42 and of tooth 44 projecting therefrom is to keep into position cylindrical body 26 partially received within substantially cylindrical body 14 before the locking operation of television tube 10 is started.

The locking operations of television tube 10 will now be described, and the function of reduced thickness portions 32 and 36 of sectors 28 belonging to substantially cylindrical body 26 will be simultaneously explained.

First of all, second member 26 is partially inserted within first member 14, by simply positioning, without any pressure, tabs 40 on outer ribs 18. Once each of the members 14 has received the associated member 26, television tube 10 is inserted withing frame 16 and brackets 12 are brought to rest on the upper surface of second member 26 while at the same time television tube 10 bears upon the upper end of extension 24 of frame 16.

At this point it should be taken into account the fact that the shape of resilient tabs 40 and the location thereof relative to cylindrical body 26 are provided in such a way as to keep the latter in a partially projecting position relative to substantially tubular body 14, for a distance long enough to assure that, in any case, the upper surface of cylindrical body 26 comes into engagement- with bracket 12 also when no compression is exerted on tabs 40, and all the way to the complete compression of the latter, when annular body 30 connecting sectors 28 comes into engagement with the upper edge of tubular body 14. The displacement available between said two end positions corresponds to the useful compensation span for the differences in the height H, and said compensation takes place within few millimeters, usually more or less 2 mm. Anyway it should be understood that said value can be further increased, depending upon the slope of resilient tabs 40.

The locking situation shown in FIG. 2 corresponds to an intermediate compression value of tabs 40, whereby when television tube 10 is positioned as shown in the above FIG. 2, cylindrical body 26 is inserted more deeply within tubular body 14.

From FIG. 2 there is apparent first of all the function of reduced thickness portions 36 of sectors 28, whereby the further lowering of cylindrical body 26 is made possible, through resilient compression and deformation of tabs 40. Therefore, reduced thickness portions 36 come to be concentrically positioned relative to tubular member 22.

At this stage, locking screw 38 is inserted, and it cooperates with a washer 48 located on top of bracket 12 and concentric relative to opening 50 thereof.

The function of reduced diameter portions 32 provided at the upper end of cylindrical body 26 should now be apparent, as it will be detailed in the following.

When screw 38 is inserted through washer 48 and opening 50 to proceed further through the upper end of cylindrical body 26, said screw 38 could cause cylindrical body 26 to undesirably penetrate further through tubular body 14. Reduced diameter areas or portions 32 are provided in order to avoid this negative action, which would result in an unsatisfactory locking of cylindrical body 26. In fact the diameter of the longitudinal passage defined by reduced diameter portions 32 is larger compared to the diameter of screw 38, whereby the latter does not interfere at all with the position taken by cylindrical body 26 due to the action of bracket 12.

In particular in FIG. 2, looking at the partially broken away area of sectors 28, it should be apparent that at first the threads of screw 38 engage only with the opposite edges of inner ribs 20 and, only after said screw has proceeded for a certain length, the screw starts to come into threading engagement with larger thickness portions 34 of cylindrical body 26. As it is apparent, in this condition screw 38 cannot transmit any further pressure action to cylindrical member 26 since it is already threadedly engaged within ribs 20, nor can the screw transmit rotation to cylindrical body 26, since the latter is retained from rotating by ribs 20.

As the screw is further driven all the way to the end, to completely lock television tube 10, the lower end of screw 38 will come into threaded engagement with second tubular member 22.

Obviously, it is possible to provide an alternative embodiment wherein second tubular member 22 is omitted, and it is replaced by providing constant width ribs 20 from one end of tubular body 14 to the other, as it is actually the case of the alternative embodiment shown in FIGS. 4 to 6, and described in the following.

Further advantages, deriving from usage of the device of the invention are the fact that threaded engagement of screw 38 within the two members comprising the subject device provides an outwardly directed thrust action between member 26 and the inside walls of tubular body 14, and between tubular body 22 and reduced thickness portions 36 of cylindrical body 26.

As it is apparent, what has been described above brings a contribution to further improvement of the locking properties of the device according to this invention.

Referring now to FIGS. 4 to 6, there is described an alternative embodiment of the device, of this invention, wherein the same innovative concept of the first embodiment is reproduced. In this respect this alternative embodiment is not described in detail, while at the same time similar parts are given the same reference numbers. The function of members similar to the ones of the first embodiment is the same and, taking this remarkable similarity into account, there is emphasized herein the limited differences between this alternative embodiment and the first embodiment.

The inner tubular member 22, which had been provided for the first embodiment has been eliminated, whereby inner ribs 20, now in the number of six, extend all the way to the bottom of substantially tubular body 14, as it can be seen more particularly in FIG. 4.

Corresponding to the number of ribs 20, the radial passages on cylindrical body 26 will be six as well, and in this case sectors 28 will have a substantially triangular cross section and extend for an angle slightly lower than 60°.

Since inner tubular body 22 has been done away with, no more provision is made for reduced thickness portions 36 on cylindrical body 26, which is provided instead, in this case as well, with reduced thickness portions 32 in the area of the upper end thereof.

Resilient tabs 40 have been replaced by a coil spring 52 whose upper end is inserted, with a slightly tight fit, around a properly shaped projection 54 provided at the bottom end of cylindrical body 26. Projection 54 has a function similar to tooth 44 of one of the resilient tabs 40, i.e. keeping cylindrical body 26 into position when spring 52, positioned around said projection 54, is inserted in the passage defined by ribs 20.

In this case as well, as it can be seen in particular at the broken away area of sectors 28 in FIG. 5, screw 38 threadedly engages at first within ribs 20 and subsequently in the larger thickness area 34 of sectors 28, whereby no further undesired inward displacements of tubular member 14 of tubular body 26 are generated, in addition to the one already caused by bracket 12.

As it can be noticed in particular from FIGS. 4 and 5, ribs 20 are provided, at the lower end thereof, with a slightly wider portion, whereby spring 52 fastened to the end of projection 54 extending from cylindrical body 26, goes to fit within the narrower passage defined by portions 56 of ribs 20, therefore being maintained into position in the same way as cylindrical body 26.

As it can be seen from FIG. 5, when screw 38, and in particular the end thereof, protrudes beyond the end of cylindrical body 26, it causes separation of projection 54 which is left within the end of spring 52 and is kept in this position by screw 38 itself.

Having replaced resilient tabs 40 of the first embodiment with coil spring 52 it has been possible to do away with cavity 46 adapted to receive extension 42, and tooth 44 of one of the tabs 40.

As to locking television tube 10 within frame 16, apart from the limited differences mentioned above, it is performed in the same manner as for the first embodiment.

For this alternative embodiment, the same advantages recalled above for the first embodiment still apply.

It should eventually be understood that variations and/or modification can be made to the self-adjusting locking device according to this invention, without exceeding the scope of the protection thereof.

For instance, spring 52 can be made integral with body 26.

In addition, ribs 18, 20 and tubular body 22 may be provided as an integral piece, inserted and welded within tubular body 14.

I claim:

1. Self-adjusting locking device for mutually locking of first and second bodies a variable distance between their fastening points, characterized in that said locking device includes a first and a second member (14, 26), said first member (14) being integral with one of the bodies to be connected, while said second member (26) is slideable and non-rotatable within said first member (14) and is adapted to partially project out of the latter under the action of resilient means (40, 52) intermediate between said first member (14) and second member (26), said resilient means (40, 52) keeping said second member (26) engaged with a fastening portion (12) of said second body (10) to be connected to said first body (16), the locking device finally including means (38) for mutual fastening of said first member (14) to said second member (26) and to said fastening portion (12),
   wherein the first member is a substantially tubular body (14) integral at one end thereof with one of the bodies to be fastened, and open at the opposite end, in order to allow said second member (26) to be partially inserted,
   wherein inner ribs (20) of said substantially tubular body (14) have a smaller width over a portion of their height, at said portion there being provided a second substantially tubular body (22), and
   wherein said second member includes sectors (28) dividing a cylindrical body (26) and having first reduced thickness portions (36) at one end, adapted to arrange coaxially with said second substantially tubular member (22) and, at the opposite end, second reduced thickness portions (32) adapted to allow a locking screw (38) to be initially inserted, without coming into engagement with said second reduced thickness portions (32), between said first and second reduced thickness portions (36, 32) there being provided larger thickness portions (34) wherein locking screw (38) threadedly engages.

2. The device for mutually locking two bodies according to claim 1, characterized in that said inner ribs (20) extend along the whole height of said substantially tubular body (14).

3. The device for mutually locking two bodies, according to claim 2, characterized in that said cylindrical body (26) is provided with only the reduced thickness portions (32) and larger thickness portions (34) extending all the way down to the lower end of said cylindrical body (26).

4. The device for mutually locking two bodies according to claim 1, characterized in that the resilient means interposed between said first member (14) and second member (26) are comprised of resilient tabs (40) radially projecting out of said cylindrical body (26) at an annular portion connecting sectors (28), said resilient tabs (40) coming into engagement with outer radially extending ribs (18) of said cylindrical body (14).

5. The device for mutually locking two bodies, according to claim 4, characterized in that at least one of said resilient tabs (40) has an extension (42) provided with a tooth (44) adapted to keep said second member (26) into position, partially inserted within said first member (14).

6. Self-adjusting locking device for mutually locking of first and second bodies a variable distance between their fastening points, characterized in that said locking device includes a first and a second member (14, 26), said first member (14) being integral with one of the bodies to be connected, while said second member (26) is slideable and non-rotatable within said first member (14) and is adapted to partially project out of the latter under the action of resilient means (40, 52) intermediate between said first member (14) and second member (26), said resilient means (40, 52) keeping said second member (26) engaged with a fastening portion (12) of said second body (10) to be connected to said first body (16), the locking device finally including means (38) for mutual fastening of said first member (14) to said second member (26) and to said fastening portion (12),
   wherein that the first member is a substantially tubular body (14) integral at one end thereof with one of the bodies to be fastened, and open at the opposite end, in order to allow said second member (26) to be partially inserted,
   wherein the second member is a substantially cylindrical body (26) provided with radial passages extending along almost the full height thereof and adapted to receive, when said body is inserted within the substantially tubular body (14), inner ribs (20) belonging to the latter, which preclude any rotation of said substantially cylindrical body (26) relative to substantially tubular body (14), and
   wherein said inner ribs (20) of said tubular body (14), at the lower end thereof, have a larger width and in the same area the lower end of a coil spring which (52) is inserted with a slightly tight fit therewithin.

7. The device for mutually locking two bodies, according to claim 6, characterized in that said inner ribs (20) of said substantially tubular body (14) have a smaller width over a portion of their height, at said portion there being provided a second substantially tubular body (22).

* * * * *